United States Patent [19]

Lundin et al.

[11] Patent Number: 5,546,584
[45] Date of Patent: Aug. 13, 1996

[54] SYSTEM AND METHOD FOR ESTABLISHING COMMUNICATION PROTOCOLS BETWEEN APPLICATION PROGRAMS

[76] Inventors: Kenneth Lundin, Skimmelvägen 4, 152 57 Södertälje; Lars-Erik Wiman, Förskottsvägen 7, S-126 44 Hägersten; Mats Svensson, Vallhornsv 10V, 142 32 Trångsond, all of Sweden

[21] Appl. No.: 422,625

[22] Filed: Apr. 13, 1995

Related U.S. Application Data

[63] Continuation of Ser. No. 907,293, Jul. 1, 1992, abandoned.

[51] Int. Cl.$^6$ ............................................. G06F 9/44
[52] U.S. Cl. ................ 395/700; 395/500; 395/200.02; 364/238.2; 364/260; 364/280; 364/DIG. 1
[58] Field of Search ................... 395/700, 650, 395/600, 500, 200; 364/188, 191, 194

[56] References Cited

U.S. PATENT DOCUMENTS

| | | | |
|---|---|---|---|
| 4,677,546 | 6/1987 | Freeman et al. | 395/425 |
| 4,736,321 | 4/1988 | Brown et al. | 395/650 |
| 4,791,550 | 12/1988 | Stevenson et al. | 395/650 |
| 5,142,622 | 8/1992 | Owens | 395/200 |
| 5,146,593 | 9/1992 | Brandle et al. | 395/700 |
| 5,175,817 | 12/1992 | Adam et al. | 395/200 |
| 5,249,293 | 9/1993 | Schreiber et al. | 395/650 |
| 5,278,834 | 1/1994 | Mazzola | 370/94.1 |
| 5,301,326 | 4/1994 | Linnett et al. | 395/700 |
| 5,313,581 | 5/1994 | Giokas et al. | 395/200 |

FOREIGN PATENT DOCUMENTS

| | | |
|---|---|---|
| 0272835A2 | 6/1988 | European Pat. Off. . |
| 0387172A3 | 9/1990 | European Pat. Off. . |
| 0501610A2 | 9/1992 | European Pat. Off. . |
| 0518195A2 | 12/1992 | European Pat. Off. . |
| 9215936A1 | 9/1992 | WIPO . |

OTHER PUBLICATIONS

Martin Heller; "Future Documents"; BYTE, May 1991, p. 126 to p. 135.

*Primary Examiner*—Eric Coleman
*Assistant Examiner*—Alpesh M. Shah

[57] ABSTRACT

A method and system for implementing a common protocol for communication of data between a first application program and a second application program. The method and system uses a high level interface specification that is created in a computer program language-independent fashion using an object oriented paradigm. The high level interface specification is used to define the common protocol, and to generate first and second protocol interfaces. Either of the generated first and second protocol interfaces is capable of performing the services of a client or server, and are inserted into the first and second application programs respectively. The first and second protocol interfaces are executed by the first and second application programs for communication of data between them using the common protocol.

34 Claims, 5 Drawing Sheets

COMMON INTERFACESPECIFICATION

```
ADT X IS
  METHODS
    CONSTRUCTOR(IN size:Integer);
    Mx(IN data:Integer);
END ADT X;
```
—180

SPECIFICATION OF UNIT
USING THE INTERFACE

```
UNIT XUser;
CLIENT OF ADT X;
END UNIT XUser;
```
—182

SPECIFICATION OF UNIT
USING THE INTERFACE

```
UNIT XProvider;
SERVER OF ADT X;
END UNIT XProvider;
```
—184

GENERATED C++-CLASSDEFINITION FOR
XUSER

186—
```
class C_X{
 public:
   enum InterfaceId{Id=1};
   static C_X* Create(int size);
   virtual void Mx(int data)=0;
   virtual ~C_X()=0;
 private:
   void* xxxNotUsed;// only here to
assure compatibility
};

class X{
 private:
   C_X* p;
 public:
   create(int size)
     {p=C_X::Create(size);}
   void Mx(int data);
   ~X()
     {delete p;}
};
```

GENERATED CLASSDEFINITION FOR
XPROVIDER

```
class S_X_Data;
class S_X{
 public:
   static S_X* Create(int size);
   virtual void Mx(int data);
   virtual ~S_X();
   S_X(int size);
 private:
   S_X_Data* D;
};
```
—188

*FIG. 7*

SYSTEM AND METHOD FOR ESTABLISHING COMMUNICATION PROTOCOLS BETWEEN APPLICATION PROGRAMS

This is a continuation of application No. 07/907,293, filed on Jul. 1, 1992, which was abandoned upon the filing hereof.

BACKGROUND OF THE INVENTION

A portion of the disclosure Of this patent document contains material which is subject to copyright protection. The copyright owner has no objection to the facsimile reproduction by anyone of the patent document or the patent disclosure, as it appears in the patent and trademark office, patent file or records, but otherwise reserves all copyrights whatsoever.

1. Field of the Invention

The invention relates to the specification of protocols and interfaces in distributed and modular computing or data processing systems such as telecommunications exchanges and, more particularly, to the specification of application level protocols, i.e., level number 7 in the Open Systems Interconnection (OSI) protocol stack.

2. Description of Related Art

One aspect of computer systems, particularly of networked or distributed systems, is that many communications protocols must be used in order to effect communications between and among the various components comprising the system. Monitoring the communications between components of a computing system necessitates the creation of well defined communication protocols. Interprocess communications within a computing system typically communicate in terms of requests and responses. Such systems have limited communications facilities and are able only to process all requests in the order in which they are received. The typical process-to-process protocols provide only this rather simple data transmission capability.

Protocols are implemented in computing systems in order to effect the orderly exchange of information between computing components. For computing components to communicate, conventions are required. Protocols may be used to build a standard communications path between two computing devices. Agreed-upon protocol conventions typically determine the nature of the data representation, the format and speed of that data representation over a communications path, and the sequence of any control messages that are to be sent. While a protocol is the logical or conceptual set of rules for communications between similar processes, interfaces comprise the set of rules between dissimilar processes and are often physical rather than logical connections. The procedure of a protocol constitutes a predetermined dialogue that must be scrupulously maintained by both ends of a communications link. At the link level, a protocol consists of an interchange of octets or octet sequences guaranteeing the control and integrity of a message transfer.

In the case of process-to-process communications within a data processing system, protocols typically provide only a very simplistic data transfer capability. Data is received only in the order in which it is sent and the information that passes between processes consists solely of the request, the response and possibly some data. All data or requests must be processed by the receiving process serially; multiple transmissions cannot be handled simultaneously. This type of communications system renders difficult the task of creating a server or some other device to allow for the simultaneous handling of multiple requests. An example of this type of system is disclosed in U.S. Pat. No. 4,396,983 to Segarra et al. that describes a system of inter-process communications within a distributed processor system.

Some servers capable of handling multiple requests have been developed, but they have typically been developed utilizing an approach that restricts the usefulness of a message based protocol. Such servers operate by sending only data addresses between processes and not the data itself. IBM Technical Disclosure Bulletin Vol. 23 No. 5, Oct. 1980, "Distributed Data Processing System," describes a modified version of such a system. Similarly, IBM Technical Disclosure Bulletin Vol. 22 No. 7, Dec. 1979, "Message-Based Protocol for Interprocessor Communication," discloses a message-based protocol for communicating between processes executing on different processors that are loosely coupled via a common bus.

U.S. Pat. No. 4,649,473 to Hammer et al. discloses a system that utilizes an inter-process information transfer facility to provide for the transfer of information between processes that may not share common storage and that may be located in more than one processor. This system uses "notes," which are packets of information. Each packet embodies a work request such that the server process can control receipt and processing of the requests and their corresponding data at its own convenience.

The advent of low cost data processing devices has brought about the development of local area communication networks that can handle a large number of devices used within a single business environment. The capabilities of prior systems were limited to the use of a single communications protocol for each different processing system. This meant that the addition of new devices once the system became operational was difficult if not impossible because the new device would be required to operate with a communications protocol identical to that of the other devices already within the system.

More advanced local area network systems have now been developed, however, that allow a plurality of remote processing devices to be connected to a host processor over a communications channel. Typically associated with each data terminal device is a communications controller having a rotary switch that can be selectively set to output the address of the controller. Each controller then sends its address to the host. The host processor will retrieve from a look-up table, stored in the processor, the program instructions comprising the communications protocol to be used by the controller in controlling the data transfer between the host and the specified remote devices. Such a system is disclosed in U.S. Pat. No. 4,787,028 to Finfrock et al.

Another drawback to currently available systems stems from the fact that technological advances have produced a variety of computer and data processing systems that operate at varying data rates and with varying formats. The computing industry has not developed or followed a set of standardized protocols. It is, therefore, often impossible for various computer systems to communicate and exchange information with each other. Presently, if individuals using diverse hardware want to communicate with a central computer or with other separate computers, data that is transmitted at a rate and in a format different from the receiving system, it will be unintelligible to the second or receiving computer. More frequently than not, the second computer will not utilize both the same rate and the same format as the first or sending system.

Systems have been developed to resolve this problem, at least partially. For example, devices have been developed in which either a software program or the computer hardware is utilized to analyze incoming data to determine the exact data rate and the precise data format being transmitted. Such systems are typically quite costly and complex, however, because they require that an algorithm be developed in which a multitude of data rates and formats are specified. The algorithm must, after determining the rate and format of the transmitted data, effect the necessary changes in the receiving computer to allow it to readily interpret the data it receives.

A "Communications Network for Communicating with Computers Provided with Disparate Protocols," as disclosed in U.S. Pat. No. 4,688,170, overcomes some of the deficiencies specified above. It describes a global communications network between various sizes and types of computers utilizing different data rates and different data formats. The disclosed system achieves this by placing a program containing a listing of the data rates and formats used in all of the computers in the global network with which any one of the computers from within the network might communicate into the memory of one of the computers in the network. The system is initiated by the individual user who must select a specific channel number associated with the computer with which the user desires to communicate. The user's computer will then log-on to the destination computer and become aware of the destination computer's data rate and format. If, however, the sending computer is the one that contains the program listing, then the sending computer would, after consulting the listing, transmit information at the rate and format applicable to the receiving computer.

Others solutions to communications problems have addressed a different aspect of the evolution in computer architectures toward distributed systems, i.e., the tendency toward the use of separate subsystems for users, resource management and communications management within a general communications network. The system disclosed in U.S. Pat. No. 4,396,983 to Segarra et al. makes it possible for any such local system to communicate with any other local system within the network without the use of a primary or central system. The disclosed system achieves this through a variety of communications constraints, as well as by managing the communications protocols through the use of specialized communications modules located within the functional communications layer of the distributed system. This system is limited, however, to certain specific types of distributed systems.

Other approaches to solve the problems in communications between and within computing and data processing systems include the CCITT recommendation for use of X. 219, Remote Operations and the ISO 9072-1, Information Processing Systems-Text Communications-Remote Operations Model of Open Systems Interconnection for CCITT Applications which were developed in close collaboration and are technically aligned. The CCITT X. 219 recommendation defines the remote operation services and notation of the Open Systems Interconnection for CCITT applications, in order to support interactive applications in a distributed open systems environment. According to the X. 219 recommendation, however, only the operations are formally specified. There is no formal specification of the actual protocols or of any interaction constraints. CCITT standards are the recommendations of the International Telegraph and Telephone Consultative Committee. Numerous CCITT communications standards have been published and have gained acceptance in the computing industry. For example, "CCITT V. 24" has been widely accepted for use in the lower layers of network architectures. Such standards are useful and necessary to define the conventional connections between data equipment and modems. Such physical standards provide an efficient, compatible interface between two differing hardware devices.

The system of the present invention is applicable to the application level, i.e., level no. 7 of the OSI protocol stack, and thus the majority of the prior art techniques discussed above which relate to lower layers on the protocol stack are not directly relevant. On the other hand, the CCITT X. 219 Remote Operations and Advanced Networked Systems Architecture (ANSA) standards relate to application level protocols and thus to the present invention. The Advanced Networked Systems Architecture, ANSA (The ISA Project), provides for interfaces wherein groups of operations are specified. Peer protocols, in which two communicating parties are considered equals and either party may initiate communications. The communications, however, must be built from two different client-server specifications having no formal connection between them. Further, the interface specifications are at least partially integrated with the implementation which causes the system to be less flexible, less modular and less system-independent. The ANSA system does provide for interaction constraints to be specified, but only for certain limited purposes not related to the specification itself. The ANSA Computational Model comprises the structuring concepts provided by ANSA for application programmers to use in designing distributed programs. It includes such major concepts as services, operations, objects, interfaces, invocations, interface types, activities and type conformance data.

Another related architecture and specification is the Common Object Request Broker developed by a group of companies, including Sun Microsystems, Inc., Hewlett-Packard, Inc., and Digital Equipment Corporation, among others. This specification provides the means by which objects in a system may transparently generate and transmit requests and receive responses. The Object Request Broker is a classic, concrete object model that further provides for interoperability between applications on different machines in heterogeneous distributed environments, providing for the seamless interconnection between multiple object systems. This specification does not provide, however, for implementation of specific peer-to-peer protocols with the parties treated as equals.

Therefore, it would be highly useful within the telecommunications industry to be able to specify certain communications protocols and other interfaces in a single, separate specification that exists apart from the implementation of either communicating party or component. That is, it would be beneficial to have a method by which multiple two-party pairs within a computing system may describe two-way communications in the same common description or specification. It is further desirable that all such protocols be able to be described in this manner, whether they are client-server protocols or peer protocols. The system of the present invention provides such a system, in part by utilizing specialized language known as ELIN. The ELIN language, its concepts and its constructs are described in detail in the "ELIN Language Reference," a copy of which is attached hereto as Attachment A and is hereby incorporated herein by reference.

SUMMARY OF THE INVENTION

The system of the present invention provides for the full specification of application level communications protocols used within a computing system, whether simplex or duplex in nature, and each protocol is stored in an off-line software development system. The protocol specifications are separate design objects which can be used as "contracts" between pairs of software modules implementing communicating parties. In the system of the present invention, the full communications "contract" between pairs of communicating parties is specified collectively. That is, the contract might include various aspects of the interaction of the pairs of parties, including their respective responsibilities, their respective allowed operations with data and directions thereof and the allowed order as to how operations can be sent between respective parties of the pair. This method of specifying protocols using an interface specification in a well-defined, specialized, but common language allows the specification to be reused for "contracts" between other communicating pairs of parties as well.

Further, this aspect of the system of the present invention increases the level of modularity achievable within a computing system and increases standardization across a system as well as the ease with which a system may be expanded. In addition, it allows for truly independent development and test of software programs that must interact with each other. This aspect of the present invention provides the capability to more readily perform independent software development and testing, even in widely disparate geographic locations.

In another aspect, the system of the present invention comprises a mechanism for specifying all internal interfaces at the application layer within a computing or data processing system by utilizing certain specially and well-defined constructs. These definitional elements allow, for example, a peer protocol specification to be developed that contains the following components: (1) a formal grouping of operations to be used within the protocols' two parties; and (2) the specification of interaction constraints for use within the protocol. In another aspect, the system of the present invention also provides the capability to specify protocols of the client-server or one-way type.

In yet another aspect, the system of the present invention comprises the use of a protocol specification for the generation of stubcode which then ensures that perfect coordination between two communicating parties is achieved. In the system of the present invention, operations are specified by the following information: operation class; arguments; results; and errors. In addition, this aspect of the system of the present invention provides for interaction constraints to be specified as part of the interface or protocol specification. This aspect of the system of the present invention aids the implementor of a communicating party using the protocol to understand which operations may be invoked at a given time.

In another aspect, the system of the present invention comprises a mechanism for generating a "protocol supervisor" to monitor the system and detect when a particular implementation is misbehaving and violating the specified rules for interaction. When a rule is violated, this aspect of the system of the present invention provides for both parties to be informed of the violation and for corrective action to be taken. Such a feature should only be triggered, however, in the event of a design fault in the implementation of one of the communicating parties. The protocol supervisor aspect of the system of the present invention, therefore, has its primary usefulness in the testing phases of system and software development.

In another aspect, the system of the present invention comprises a means for specifying interaction constraints comprising a set of symbolic states each with a list of allowed operation components. The result of the interaction constraints specification is a finite state machine, i.e., the protocol supervisor. Each operation is specified separately and in an operational specification in which arguments, results and errors are specified with name and datatype, which in turn may be of either the primitive or constructed type.

In another aspect, the system of the present invention employs an object oriented interface design language, referred to as ELIN, that may be exercised in order to create uniform, independent interface specifications. The ELIN language, consisting of a number of unique and specialized terms and constructs, provides a mechanism for creating specifications for use with two-way communications. The resulting specifications may, therefore, be utilized by multiple pairs of communicating parties for the specific implementation of their communications interface protocol. Further, the ELIN language provides a mechanism for describing not only communications of the type in which one party controls the data exchanges, but also communications in which both parties act as equals and either may initiate and/or control the data exchanges.

In yet another aspect, the system of the present invention comprises a mechanism for interface specification that achieves independence from any programming language and any specific computer architecture. From the specifications created using the ELIN language of the system of the present invention, tools may then be applied in order to generate stubcode for various individual programming languages. This stubcode generation aspect of the system of the present invention is vital to the entire system and mechanism. The concept as a whole relies on these stub- code generators to provide an efficient and intuitive interface to the specified protocol for the system or applications programmer.

As will be readily appreciated by those of ordinary skill in this particular art, the principles and aspects of this invention could also be utilized to advantage in a variety of computer applications other than telecommunications switching systems.

BRIEF DESCRIPTION OF THE DRAWINGS

For an understanding of the present invention and for further objects and advantages thereof, reference can now be had to the following description, taken in conjunction with the accompanying drawings in which.

DETAILED DESCRIPTION

The system of the present invention utilizes, in some aspects, principles of object-oriented programming. Object-oriented programming involves essentially four elements-classes, objects, instance variables (or data members as implemented in C++), and methods (or member functions in C++). A class is simply a template used to define objects, which are instances of the class they are created from. Classes have two types of components-instance variables and methods. Instance variables serve as data elements and methods serve as functions, i.e. , they define an object's behavior. Instance variables and methods can be combined in a single common object in execution time. That is, an object encapsulates an instance of the variables which could be manipulated by using the methods. Hence, programming is performed with a focus on objects, rather than on the functions or tasks to be performed.

Certain techniques of object-oriented programming, well known in the art, are incorporated into the system of the present invention in the preferred implementation of the system of the present invention in the programming language C++. Such techniques include inheritance, polymorphism and encapsulation. Inheritance enables a new class to be derived from an existing class so that code is easily reusable, so that data and code can be added to a class or the behavior of a class can be altered, without having to change the existing class. Polymorphism is the property that provides the ability to use different types of objects in the same way because the different object types share a common interface. Inheritance of interfaces is the property that makes it possible to derive other object types from a common denominator. Finally, encapsulation is a technique for combining the data and operations needed to process the data all under one "roof." It further allows the capability to protect the data from excessive or unnecessary access and to hide the details of the data organization.

In the system of the present invention, the public interfaces connecting software units to the outside environment (except for cross-compilers and related libraries) are all specified using ELIN. This allows all software units to be specified in terms of the interfaces to which they are connected, with such specification driving a stubcode generator. What follows is a step by step description for developing a software unit using ELIN, illustrated according to the preferred method for developing object-logic implemented in C++. Other parallel processes are used to develop database specifications, function-units and other elements of a system. The following steps illustrate object-block development (steps 1 and 2), object-unit development (steps 3 to 6) and packaging (step 7).

| Step 1 | Interface-specifications are available or new ones are specified in ELIN. |
| --- | --- |
| Step 2 | A software-unit with interfaces is identified. |
| Step 3 | C++ header-files are generated from the unit-specification and the specifications for interfaces to which the unit is connected (ADT, PROTOCOL, PERSISTENT ADT). |
| Step 4 | The hand-made code is written in .h and .cc files which if needed includes the generated .h files. |
| Step 5 | All .cc files are compiled with a cross-compiler and an object-file (.o) is produced for each of the .cc files. |
| Step 6 | All object-files are linked together with standard libraries and the complete software-unit is created. |
| Step 7 | Those software-units within a system-entity that must be allocated to the same processor are packed together. The packages are called load-packages and can contain a set of units of varying type. |
| Step 8 | Transfer the packages to the target-system. |
| Step 9 | In the target-system: Store the package temporarily. |
| Step 10 | Link/relocate and copy the loadmodules from the package into suitable places in memory depending on type of information. |

Figure 1:
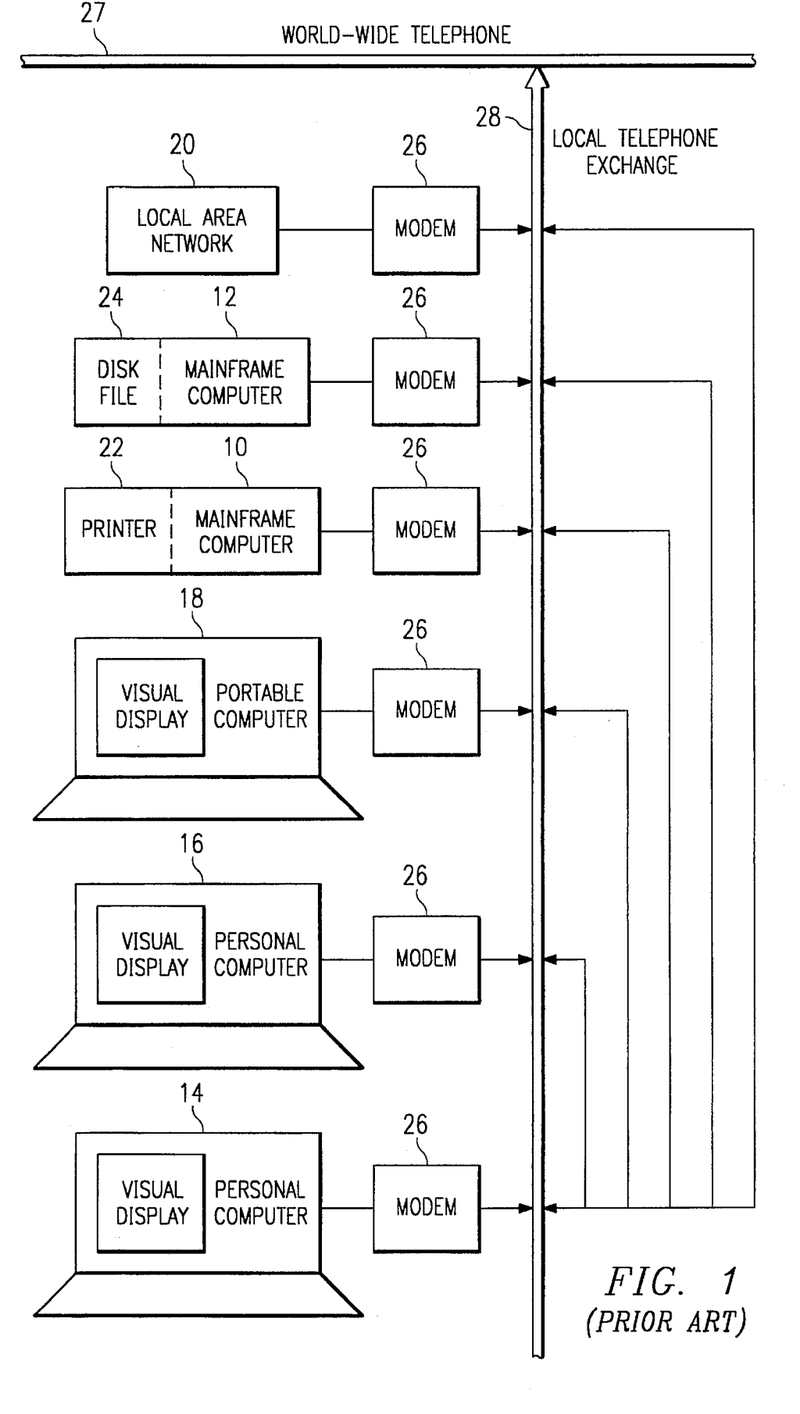
FIG. 1 is a functional block diagram illustrating a prior art communications network for communicating with computers having disparate protocols.

Referring first to FIG. 1, there is illustrated a communications network in the prior art that enables communications between computers having disparate protocols. Although the computers may employ diverse data rates and data formats for receiving and transmitting data, they are still able to communicate intelligently with each other in the illustrated network. This communications network can, for example, include a number of diverse main frame computers 10, 12, a number of personal computers 14, 16, a portable computer 18 and a local area network gateway 20. The main frame computers 10 and 12 as well as the personal computers 14 and 16 could include such peripherals as a printer 22 and a disk file 24. All of the computers communicate with one another through independent modems 26 and a worldwide telephone system 27 or local telephone exchange 28.

However, since the various computers which utilize this communications network are programmed to transmit or receive data based upon specific bit rates and data formats, communications between these various computers will be impossible unless each individual computer has knowledge of these various bit rates and data formats. For example, each of the data formats would include a data packet having a parity bit, would be of various word lengths, would include a cyclic redundancy check and would either be synchronous or asynchronous. The illustrated system in FIG. 1 allows communication between these systems by providing a program which is stored in the random access memory ("RAM") of at least one of the computers in the network. This program would contain the various bit rates and data formats which are utilized by the various types of computers with which the computer wishes to communicate. Often, the program which is stored would not contain these specific data bit rates and data formats, but would contain the information needed to implement a system for simulating the various data rates and data formats. In this situation, the individual user would determine the various data bit rates and data formats which are used to communicate with the computers of interest and would input this information into the computer himself.

Figure 2:
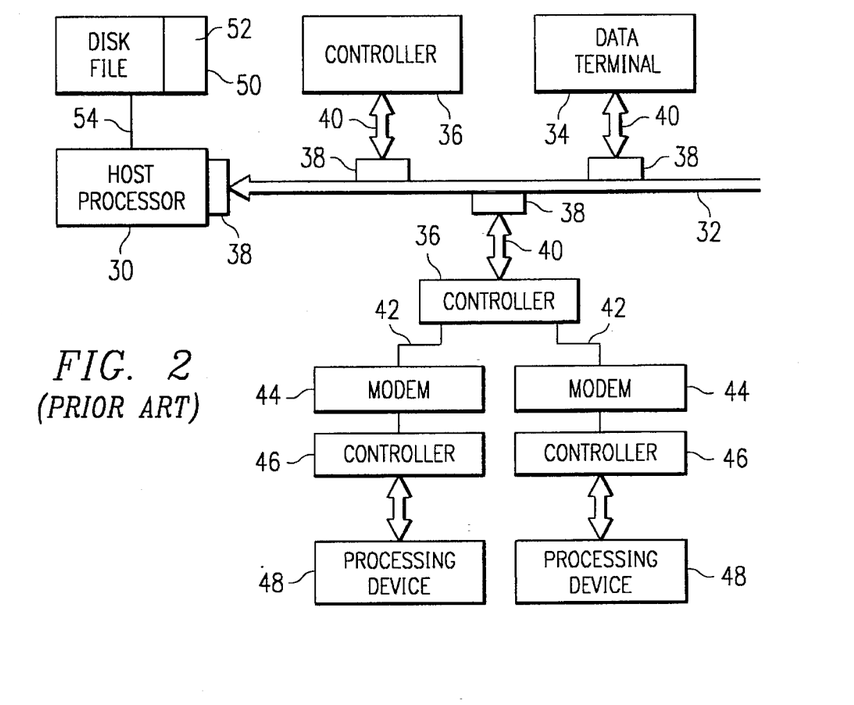
FIG. 2 is a block diagram illustrating a prior art data processing system that accommodates a plurality of remote devices each operating under a different communications protocol by using communications controllers that output signals comprising the address of the controller.

Referring next to FIG. 2, there is illustrated a prior art data processing system that accommodates multiple remote devices using different communications protocols via use of communications controllers that output signals alerting the host processor to their addresses. The disclosed system comprises a local area network processing system in which a plurality of remote processing devices such as point-of-sale data terminals are connected to a host processor over a communication channel. Associated with each of the data terminal devices is a communication controller on which is mounted a rotary switch member which is selectively set to output binary signals comprising the address of the controller. When a power-up condition occurs for the system, each controller will send a message including its address to the host processor identifying the controller. The host processor, using the address of the controller as an address, will retrieve from a look-up table stored in the processor the program instructions comprising the communication protocol which will be used by the controller in controlling the transfer of data between the host processor and the remote processing devices. The instructions are loaded into a RAM memory located within the controller. The address switch is manually set so that each controller will have a different address.

Referring again to FIG. 2, there is shown a block diagram of a data processing system in which a host processor 30 is coupled over a communication channel or link 32 to a plurality of remote processing devices which may include a data terminal device 34 and a communication controller 36 which controls the transfer of data between the terminal device 34 and the host processor 30. The controller 36, the processor 30 and the terminal device 34 are each connected to the channel 32 through a tap box 38 and a bus 40. As will be described more fully hereinafter, each of the controllers 36 is capable of being coupled over communication lines 42 through modems 44 or directly to a remote controller 46 which in turn controls the transferring of data between the host processor 32 and processing devices such as data terminal devices 48 connected to the remote controller 46. A disk file memory 50 connected to the host processor 30 over line 54 includes a look-up table 52 which contains a plurality of programs associated with different types of communication protocol such as asynchronous, bisynchronous and bit synchronous that are used by the remote processing devices in transferring data over the channel 32. For a complete description of the different types of communication protocols, reference should be made to U.S. Pat. No. 4,346,440 issued Aug. 25, 1982.

Figure 3:
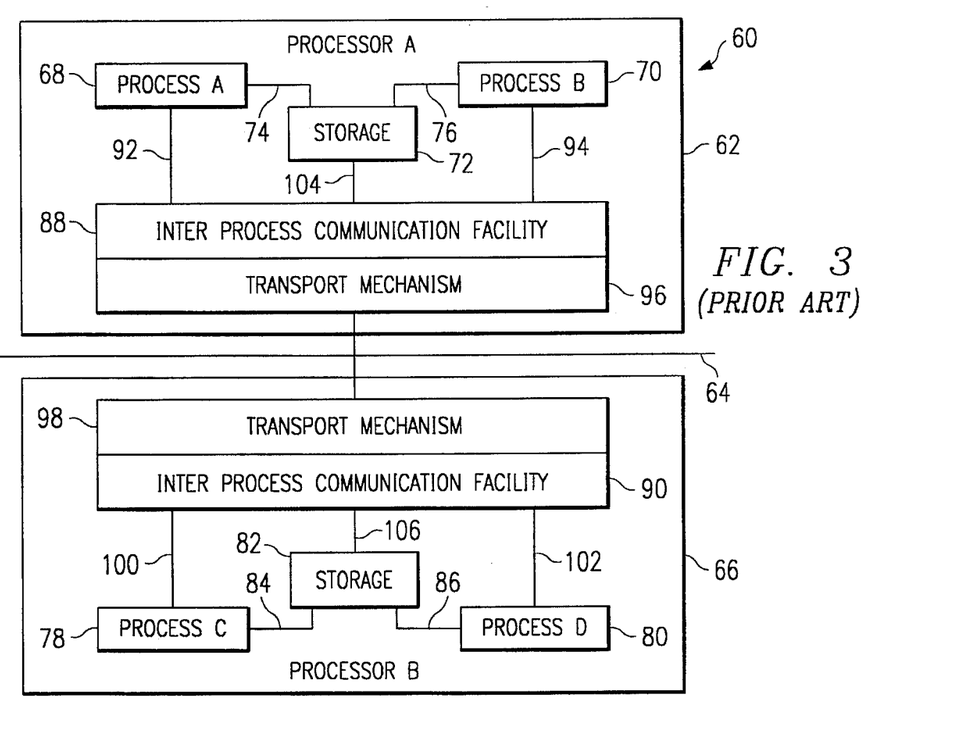
FIG. 3 is a diagrammatic overview of a prior art multi-process system having an inter-process communications facility for controlling communications between processes within a processor system.

Referring next to FIG. 3, there is illustrated an overview of a prior art multiprocess system that utilizes an interprocess communications facility for communications between processes within a processor system. In FIG. 3, a high level view of a distributed process environment is indicated generally at 60. A processor A indicated at 62 is coupled by a physical path indicated by a line 64 to a processor B indicated at 66. Processor A is indicated as having a process A indicated at 68 and a process B indicated at 70 residing therein. A storage area 72 is associated with process A and process B as represented by lines 74 and 76 respectively to provide the processes control of and access to data storage.

Processor B is indicated as having a process C indicated at 78 and a process D indicated at 80 residing therein. A storage area 82 is associated with process C and process D as represented by lines 84 and 86 respectively to provide the processes control of and access to data storage.

Processes, or executing programs within the processors, need to communicate with each other. In processors of differing configurations, or in the same processor as it changes over time, two processes that communicate may be in different relative locations and may have different physical paths between them.

In the system illustrated in FIG. 3, an interprocess communication facility (IPCF) is provided within processor A and processor B at 88 and 90, respectively, to accommodate inter- process communication which is location-transparent to the communicating processes. IPCF 88 is coupled to process A in processor A as represented by a line 92 and to process B as represented by a line 94. Lines 92 and 94 represent interfaces between process A and process B to the IPCF 88. These interfaces permit communication between process A and process B provided appropriate data paths are established. IPCF 88 is also coupled through a transport mechanism 96 by line 64 through a transport mechanism 98 in processor B to IPCF 88. IPCF 88 is in turn coupled as represented by interface lines 100 and 102 to process C and process D. These interfaces with the IPCFs and the transport mechanisms permit establishment of communication between all the processes indicated, without process knowledge of the location of the process it is communicating with.

In the system illustrated in FIG. 3, the transport mechanisms 96 and 98 preferably comprise a plurality of transport mechanisms such as local transport mechanisms for use when process A and process B or process C and process D communicate within a single processor. If processor A and processor B reside in the same machine, a bus transport mechanism is used to facilitate communication between processes on processor A and processor B. For intermachine communication, a communication protocol such as SNA is suitable for use.

The transport mechanisms 96, 98 are data movers. They are responsible for transferring bytes of data from one place to another and do not understand the meaning of the information being moved. Thus, storage 72 in processor A is coupled to the transport mechanism 96 as represented by a line 104 and storage 82 in processor B is coupled to transport mechanism 98 as represented by a line 106 to permit information transfers directly by the transport mechanisms 96, 98.

The IPCF of the process attempting to communicate chooses the transport mechanism for the communication. The communicating processes need not be aware of the mechanism used. The process attempting to communicate supplies the name of the target process, as it is known to the process attempting to communicate, to the IPCF which uses an appropriate directory service to locate it. The IPCF then selects the appropriate transport mechanism and uses system-supplied services to set up the connection between the processes in a standard manner. IPCF can be used by all levels of processes, from applications to basic system services such as a paging manager.

To permit the us e of many different transport mechanisms, each with different capabilities and characteristics, the IPCF includes a generic transport mechanism interface to each process. The interface defines a set of functions for the establishment of connections and for the passing of information between processes. The functions defined are mapped onto the transport mechanisms used by IPCF. Programs written to the interface are independent of the transport mechanism and therefore are independent of their relative locations when communicating.

Communication between processes is in terms of sending and receiving messages over a connection between them as established by IPCF. The messages contain work requests and/or data. Relative to a particular work request, a process assumes the role of a requestor or a server. The requestor initiates a work request by sending a request to a server that carries it out. Requests contain a work request (a command and its parameters) and optionally some data. Both the request and the data are of variable length.

Figure 4:
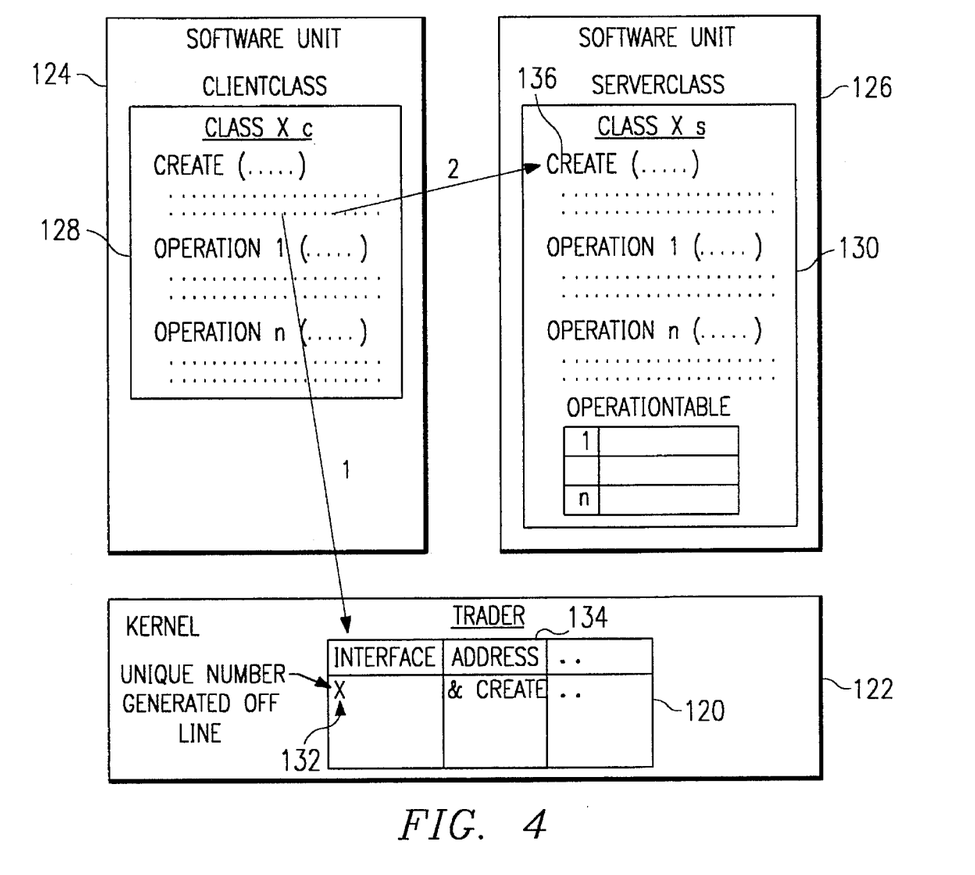
FIG. 4 is a block diagram illustrating the manner in which the common interface specification of the system of the present invention is utilized for a server-client type of interface specification used for dynamic runtime linking accomplished in a programming language independent manner.

Referring next to FIG. 4, there is illustrated therein the fact that the mechanism creating and relating classes and instances of classes using the concept of a trader 120 contained within a kernel 122 in the operating system, which enables an interfacing relationship between a pair of software units 124 and 126, containing, respectively, a client class of objects 128 and a server class of objects 130. FIG. 4 illustrates in detail the steps required in order to create objects within the system, as well as how created objects can be called or manipulated by means of the code residing in the server software located in the "server" software unit 130.

Objects are instances of classes which are language constructs that contain both data and code or functions within a single package or unit. Because they are able to contain definitions of both data and functions within a single package or unit, they act as miniature, independent programs. They can be used, therefore, as building blocks in creating more complex programs without having to redevelop the code necessary for those functions. Because they can be maintained and modified independently, program maintenance and revision is simplified.

A class is a template that is used to define an object, and an object, therefore, is an instance of a class. A class contains two component types, instance variables or data members and methods or member functions. In order to support programmers developing programs that play the client role within the computer system, a client-class is automatically generated through the use of an interface specification. The generated client-class acts as a sort of agent for the server-class. The client program units of the system call operations from the client-class objects in order to ensure that calls are transferred to the software implementation residing in the server-class. Therefore, all code relating to the dynamic binding function is found in the client-class although it is hidden from the user of the client class. The user of the client class gets the impression of manipulating the server.

Class declarations control the manner in which the compiler will store the addresses in the objects-data and in what order the addresses in the operations tables will be set forth. Some class declarations are automatically generated by the system. When an object is created within the system, its "create method" can be located through a request to the trader 120 portion of the operation system located within the kernel 122. The trader 120 contains information, i.e., memory addresses, of the locations of all implementations of interfaces. As software units are loaded into the computing system, it publishes certain information about its accessibility to other units, in the Trader 120. The addresses to the functions creating objects of its type is also published in the Trader 120 in an address 134 that points to the create method 136 in the server class 130.

In order for a software unit 124 to create a new object of a certain type, it must first ask the Trader 120, providing information about the class for which a new object is desired. Through a unique number generated off-line "X" corresponding to the interface specification 132, it may receive the address of the proper create method 136 which is used to call that function. What is returned is the address of the newly created object or instance of the desired class.

The mechanism illustrated in FIG. 4 is utilized as part of a Linked Procedure Call mechanism as disclosed in co-pending U.S. patent application entitled "System For Dynamic Run-Time Binding of Software Modules in a Computer System", Ser. No. 07/907,307, filed on Jul. 1, 1992, in the name of K. Lundin et al, assigned to Telefonaktiebolaget L M Ericsson, and hereby incorporated by reference herein. The Linked Procedure Call mechanism implements a system for dynamic runtime binding of separately loaded software units. In particular, this is useful within the context of a system for changing software during computer operations in which both old and new versions of software will coexist for a certain period within the system. Such a system for updating or changing software during operation is disclosed in co-pending U.S. patent application entitled "System For Changing Software During Computer Operations", Ser. No. 07/907,294, filed on Jul. 1, 1992, by Nilsson et al, assigned to Telefonaktiebolaget L M Ericsson, hereby incorporated by reference herein. In that system, trading is used to access an interface using the linked procedure call. The necessary data is available in the Trader 120 because, at load time, all interfaces accessible via the linked procedure call mechanism are published to the Trader 120 in the operation system Kernel 122.

Figure 5:
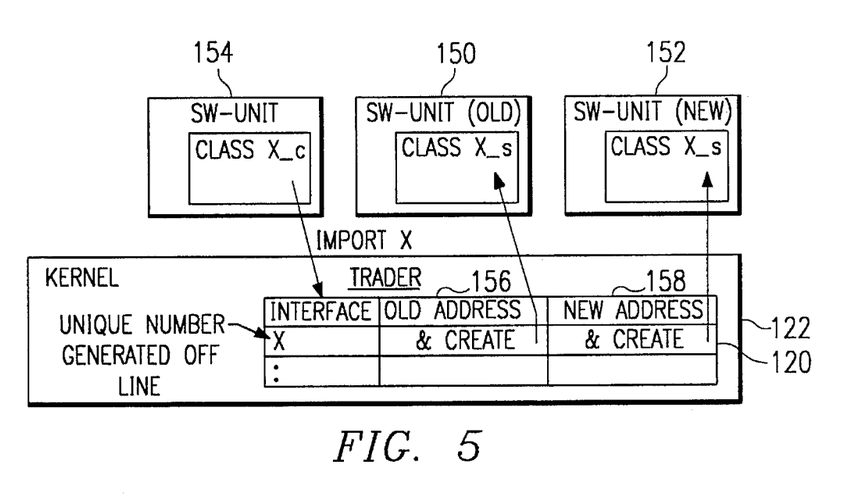
FIG. 5 is a block diagram illustrating the manner in which software units can be addressed by means of the trader in the system of the present invention. Input to the trader is generated from the interface specifications and unit specifications.

The diagram of FIG. 5 illustrates the manner in which the program unit's old software 150 and new software 152 are inter-linked and bound during runtime via the aforementioned Linked Procedure Call mechanism. The trader 120 within the kernel 122 can direct the execution of the software unit 154 toward either the old software unit 150 or the new software unit 152. While making the replacement, the server-classes from both the old and the new versions each have their interfaces published in the trader 120. The trader 120 contains two address entries for each interface specification, on entry 156 for the old software unit 150 and one entry 158 for the new software unit 152. Processes created prior to the replacement will receive an address pointing to the old software unit 150 and its sever-classes while other processes may receive addresses to new versions of the server-class.

After the replacement has been completed and activities within the old software unit 150 have ended, the old software unit 150 can be removed from memory and the interfaces published by the server-classes in the old software unit 150 may be withdrawn. If an attempt to withdraw these server-classes from memory is made prior to all processes within the old software unit running to completion, the system generates an exception call from the kernel 122. An exception handling process within the system then allows the non-completed process the opportunity to recreate itself and utilize the new software unit 152 or else to terminate.

As part of employing the Linked Procedure Call mechanism, the interface specification of the system of the present invention is written in an object oriented interface description language referred to as ELIN, a complete language reference for which is attached hereto as Appendix A. In this language, there are special constructs, referred to as abstract data types (ADTs), that are specially aimed at the specification of linked procedure call interfaces. An ADT in the ELIN language is a specification of the interface provided by objects of certain types. These objects are well suited to be implemented as instances of a class if an object oriented programming language is employed. A specification for a linked procedure call interface in ELIN language will include the following information:

(a) a name for the specification;
(b) other interfaces used as a base for this interface;

(c) one or more constructors (used for creating instances); and (d) zero or more method-specifications, each of which consists of a method name, arguments, return type and exceptions.

Set forth below, in code, is an example of an interface specification that could be used as part of a Linked Procedure Call mechanism and that describes an interface to objects of type stack:

```
ADT Stack IS
    BASE TelecomObject;
    METHODS
        CONSTRUCTOR (IN size: Integer);
        push (IN data: Integer);
        pop () RETURNS Integer;
END ADT Stack;
```

© 1992 Telefonaktiebolaget L M Ericsson

This interface specification defines an ADT called Stack, the base being called "TelecomObject." Objects of this base can accept process calls from the listed function members. Having a base identified indicates that there is another specification of this type that is called TelecomObject. That base also has certain specified methods which the current, as a derived ADT from the base ADT, will inherit. The function members or methods specified in the above ADT definition are in addition to those specified in the base ADT. In sum, the above code comprises an ADT specification which is one type of interface specification that can be created within the system.

An interface can be derived from another interface which then is called the base interface of the derived interface. Interfaces can be derived from more than one other interface, with the derived interface inheriting from the operations of each of its base interfaces. The derived interface may, in addition, declare its own additional operations, although it may not define operations having the same name as those inherited from the base interfaces. It should be made clear that inheritance only affects the interface-level of the class, not the implementation level.

Figure 6:
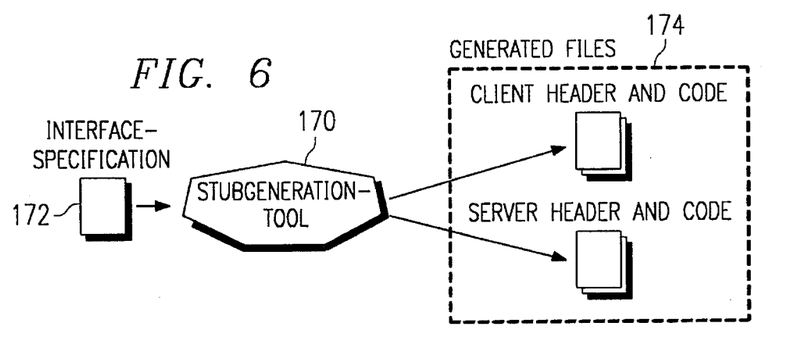
FIG. 6 is an illustrative diagram of the manner in which the interface specification may be utilized to generate stub-code for the facilitation and coordination of communications in the system of the present invention.

As shown in FIG. 6, the system of the present invention includes a stub-code generation tool 170 which is used to certify the coordination between the client and the server that are not necessarily linked together. Instead binding can occur dynamically in runtime through the use of the stub-code that has been generated for each side of the interface specification 172. The interface specification 172 is specified in a language-independent fashion, albeit using the object oriented paradigm. The stub-code generation process ensures that a mapping to one of several programming languages is achieved and in the following sections, there is a brief description of how such a mapping could be performed using the language C++.

Referring again to FIG. 6, there is illustrated a way in which an interface specification 172 employs the stub-generation tool 170 in connection with a set of generated files 174 in the system of the present invention. FIG. 6 illustrates, in particular, the overall structure of the C++ mapping as implemented in that language. An interface specification, written in the object oriented interface description language, ELIN, as used in the system of the present invention, is similar to a class definition used in the programming language C++. Likewise, the mechanism for accessing operations through objects is similar to the manner in which the programming language C++ handles virtual member functions. Therefore, the mapping on C++ illustrated in FIG. 6 is instructive as to the operation of this aspect of the system of the present invention.

The stub-generation tool 170 generates two files for both the client side and the server side, one with the suffix ".h" (header) and one with the suffix ".cc" (code). For the client, the ".h" or header file contains two class definitions. One class is a compatible copy of the corresponding class in the server's ".h" or header file as far as the virtual member functions and instance variables are concerned. This assures compatibility between the client and server and makes it possible for the client to call objects created by the server. This class constructor is private, however, so that the class cannot be used to create automatic objects on the stack. The second class is the one to be used the client that acts as a smart pointer through which objects created by the server can be accessed.

For the server side, the same two ".h" (header) and ".cc" (code) files are generated by the stub-generation tool 170. The contents of the ".h" file consists of one class definition that will ensure compatibility with the client. This is the class that is used as a base for implementation. Implementations can be based directly on the generated class or the generated class can be used as a base from which to derive other classes. The ".cc" file contains a skeleton for the "createmethod" and code that performs the publication of the address of the createmethod. The body of the createmethod is responsible for creating an object that is compatible with the generated class and returning a pointer to the newly created object.

There are several reasons for generating differing yet compatible class definitions for the client and server sides rather than one shared class definition. First, it provides different levels of visibility for members in the client and the server. For example, a constructor must be public in the server but should not necessarily be public if it resides in the client. Second, the client and server programs can be linked together for test purposes without encountering the problem of name collisions if different classes are used.

Figure 7:
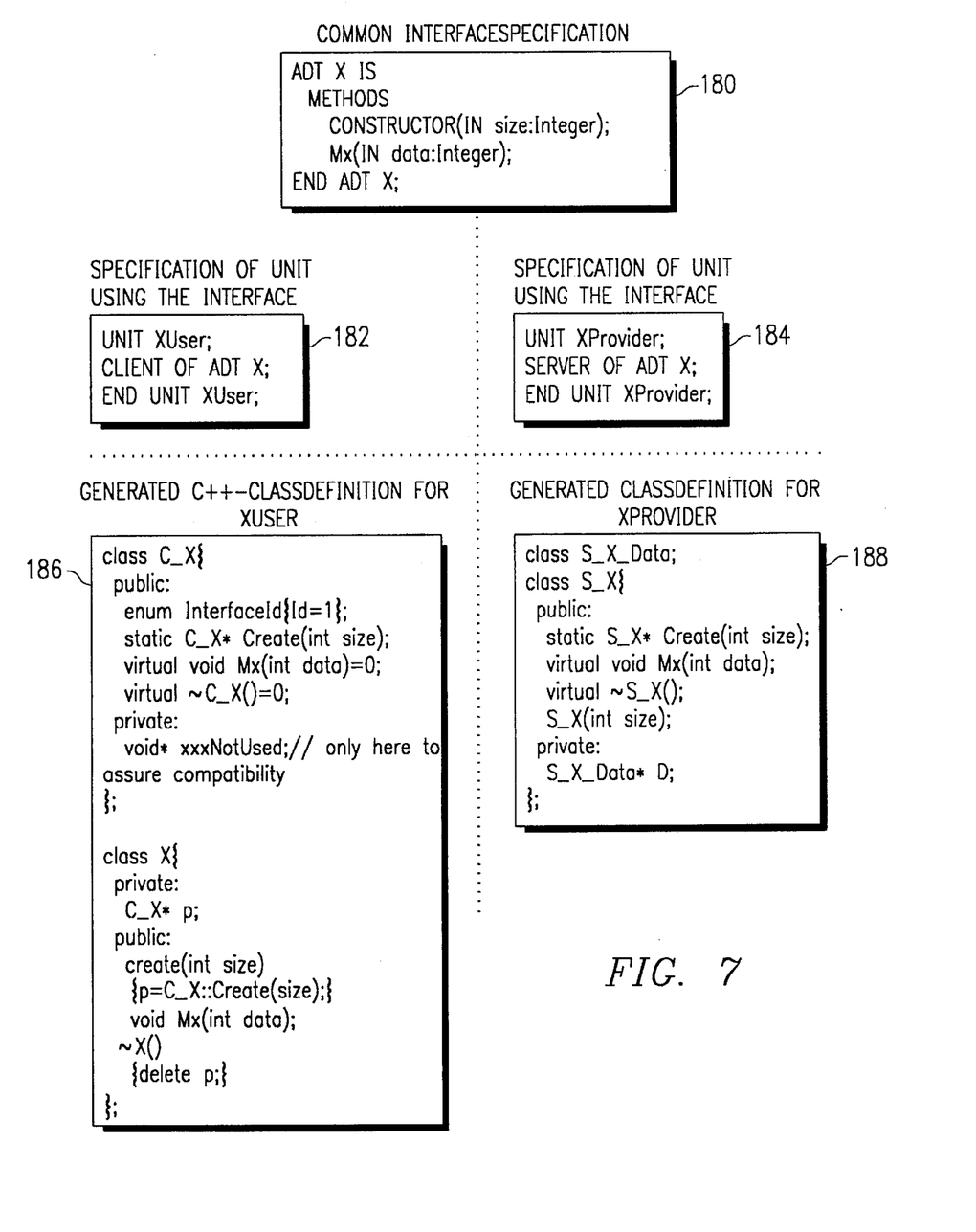
FIG. 7 is a diagram illustrating the manner in which interface specifications are utilized within the system of the preset invention.

Referring next to FIG. 7, there is shown a certain arrangement of charts illustrating examples of certain specifications and class definitions and their relationship to one another as employed in the system of the present invention. FIG. 7 illustrates the logical structure of certain generated files and written specifications as they might be implemented in the system of the present invention. At the highest level, the Common Interface Specification 180 defines an ADT "X" and the methods for which the class will accept calls. Logically subordinate to this ADT, at the next level of definition is a specification for a user unit 182 of the Common Interface Specification 180 and a specification for a provider unit 184 of the Common Interface Specification 180. The user unit is specified to be a client of ADT X while the provider unit is specified to be a server of ADT X.

At the next logical level below the unit specifications 182 and 184 are the generated class definitions for users and providers respectively. The generated class definition for XUser 186 illustrates certain user classes defined for both public and private use. The generated class definition for XProvider 188 illustrates certain public and private definitions for provider data and functions.

Figure 8:
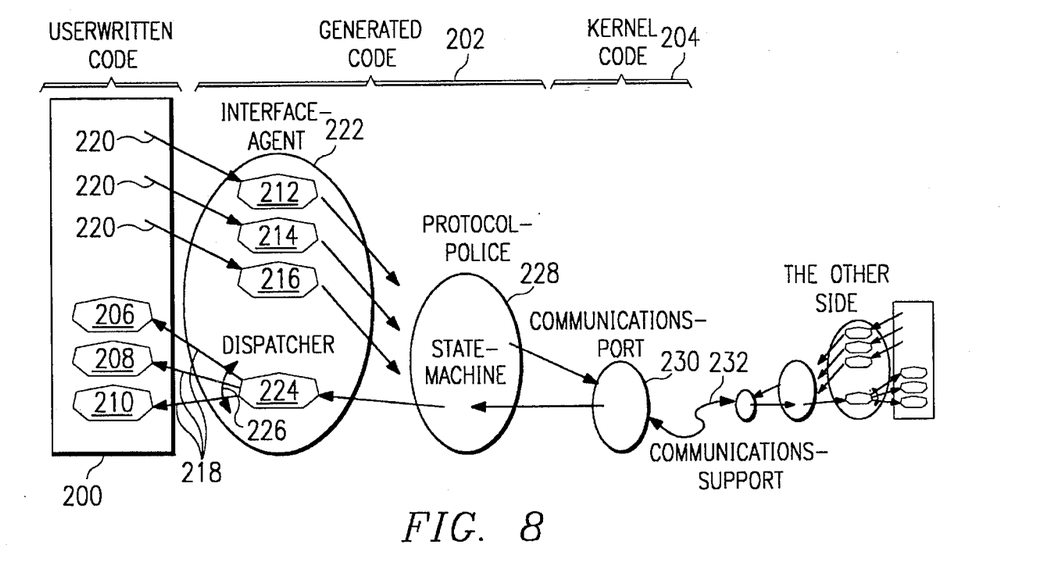
FIG. 8 is an illustrative diagram of the manner in which an object oriented interface description language is utilized to implement common interface specifications or protocols that facilitate communications within the system of the present invention.

Referring finally to FIG. 8, there is shown an illustrative diagram of how a protocol specification is used for generation of stub-code, which assures perfect coordination between two communicating parties. The structure of the stub-code is illustrated in FIG. 8 and includes User-written code 200, Generated Code 202 and Kernel Code 204. In distributed and modular computer systems, an example of which is a telecommunications system, many application level protocols are utilized to facilitate communications in and among various portions of the system.

Protocols can be viewed as a collection of contracts between pairs of parties within the system who agree to communicate in a particular manner and format. Some protocols can be described as client-server protocols wherein only one party is an initiator. Other protocols, called peer protocols, allow both parties to initiate communications. In the system of the present invention, unlike other existing systems, the entire agreement or protocol between pairs of parties is specified in a single interface specification that is separate from the specific implementation of the parties. That is, the "contract" between pairs of parties might include various aspects of the interaction of the pairs of parties, including their respective responsibilities, their respective allowed operations with data and directions thereof and the allowed order as to how operations can be sent between respective parties of the pair. This implies, therefore, that this single specification can serve as a generic agreement that can be reused for agreements between any pair of parties within the system. The system of the present invention implements the single interface/protocol specification for pairs of parties to a communications contract in the proprietary object-oriented interface description language known as ELIN. The specification in such a language, of peer type protocols, for example, includes the following components: (1) a formal grouping of operations into protocols, each protocol having two parties; and (2) a specification of interaction constraints. The peer protocol specification exists separately from the implementations that use the protocol to execute their communications. The peer protocol specification is organized according to the following format: (1) Protocol Name; (2) 1st Party's Name and its Accepted Operations List; (3) 2nd Party's Name and its Accepted Operations List; (4) Interaction Constraints (Optional).

Set forth below, in code, is an example of a protocol specification for a pair of parties with interaction constraints. The information included in such a protocol specification may be used for the generation of stubcode:

```
PROTOCOL CommunicationService;
    PARTY DataProducer;
        ACCEPTS
            StartTransmission,
            Terminate Transmission, ReSendData;
    END PARTY DataProducer;
    PARTY DataConsumer;
        ACCEPTS
            StringData, IntegerData,
            NoMoreDataToSend;
    END PARTY DataConsumer;
    INTERACTION
        STATE START
            WHEN StartTransmission THEN Started;
        STATE Started
            WHEN TerminateTransmission THEN START;
            WHEN IntegerData THEN Dataphase;
            WHEN StringData THEN Dataphase;
        STATE Dataphase
            WHEN IntegerData THEN Dataphase;
            WHEN StringData THEN Dataphase;
            WHEN ResendData THEN Dataphase;
            WHEN NoMoreDataToSend THEN
                Dataphase Ended;
        STATE DataphaseEnded
            WHEN ResendData THEN ResendOrdered;
            WHEN TerminateTransmission THEN START;
        STATE ResendOrdered
            WHEN StringData THEN DataphaseEnded;
            WHEN IntegerData THEN DataphaseEnded;
END PROTOCOL CommunicationService;
```

© 1992 Telefonaktiebolaget L M Ericsson

The logical structure of a party communicating within the system is also illustrated in FIG. 8. As illustrated in FIG. 8, the specialized terminology and constructs comprising ELIN are used to describe communications between processes and processors across the system, as well as data types utilized within the system. Unlike other systems known in the art, this aspect of the system of the present invention provides the capability to locate all interface information for use throughout the system in a single off-line location. Further, the protocols used and defined in this aspect of the present invention allow devices to act as equals, with either party initiating communications. Parties are not pre-defined as either a master or slave for communications purposes. This aspect of the system of the present invention allows systems that are developed and operated in different and distant places to easily interoperate, so long as each is developed using the single specified interfaces. The protocol specifications of this aspect of the system of the present invention are separate and distinct from any applications implementation within the system. As further illustrated in FIG. 8, the User-written code 200 acts as one party in the communications protocol that may both send and receive signals, if the signals meet the protocol specification. The data receiving tools 206, 208 and 210 handle incoming signals arriving in the protocol. The data sending procedures 212, 214, 216 comprise code automatically generated by the stubgeneration tool to create and send signals out into the system in accordance with the protocol specification. The actions of receiving the signals 218 and of sending the signals 220 are all directed through an interface agent 222, that is part of the Generated code 202. This interface agent 222 is the mandatory portion of the generated code 202 and must be present for the interface and the protocols to function properly. The dispatcher 224 is a procedure that is generated by the stubgeneration tool and that is called for each incoming signal to that particular implementation of the specification. The dispatcher 224 receives the signal, decodes the signal, separates the signal identifier from the body of the signal and then distributes it as illustrated at 226 to the procedure to be written in this implementation.

The protocol police 228, an optional portion of the Generated code 202, serves to supervise traffic and to determine whether the two communicating parties at any given instance are abiding by the interface rules in sending or receiving signals. The protocol police 228 operates as a state machine in supervising obedience to the protocol rules. The logic of the state machine is expressed in the example code provided above.

In the Kernel code 204, as illustrated in FIG. 8, resides a communications port 230. This communications port 230 is viewed by the addressing mechanisms of the system of the present invention as a passive support means. The communications port 230 is unaware of the protocol that is being passed through it, but serves to facilitate the communications. The communications support 232 is the general communications support that exists within the operating system. It can operate between processes within the same processor or between processes on different processors. If it is operating between processors, the communications support 232 would constitute a hardware communications link. The mirror image of the entire illustration contained in FIG. 8 would represent the corresponding activities that occur in the support and operation of a second communicating party within the system.

As illustrated above, the system of the present invention enables the specification of common protocols or interfaces, for use throughout a computing or data processing system to be generated and stored in a single off-line location. It further allows for such common specifications to be created using specialized terminology and constructs that allow the specifications to be easily and generically formulated and to be created in a language-independent manner. Such an approach increases not only the ease of use, but also the modularity and expandability of the system comprising these aspects of the present invention. Further, the system of the present invention allows the specifications to be cloned for specific implementations and to be used by certain stubgeneration tools to create language-specific implementations. The common interface specifications of the present invention can further be used to accomplish dynamic binding of software units and runtime changing of software through providing pointer information relating to published or accessible interfaces and software units.

It is thus believed that the operation and construction of the present invention will be apparent from the foregoing description. While the method, apparatus and system shown and described has been characterized as being preferred, it will be readily apparent that various changes and modifications can be made therein without departing from the spirit and scope of the invention as defined in the following claims.

What is claimed is:

1. A method for generating and monitoring the interaction of a plurality of a dynamically varying set of software modules, in a computing system having one or more processors, wherein each of said software modules is capable of interactively creating and manipulating objects belonging to one or more object classes, each of said object class being automatically generated from an interface specification, said method comprising the steps defining a computer-language-independent interface specification to govern the interaction of said plurality of software modules across one or more processors by the steps of;

providing a unique name for said interface specification;

providing a list of one or more in instance variables which define the characteristics of a class of objects;

providing zero or more interaction variables specifying the public or private interaction of a group of said objects; and specifying constraints if any, on the interaction of said software modules;

converting said computer-language-independent interface specification into a computer-language-specific interface implementation for a specific computing system using at least the following information;

a name of a communications protocol to be used for the interchange of data between said software modules;

an identification of the software modules that need to exchange data to interactively create and manipulate objects;

an operational command set for each such software module: and the constraints, if any, on the interaction of said software modules;

creating a plurality of functional software modules that are capable of interacting or communicating with each other using said computer-language-specific interface implementation;

regulating the interaction of said software modules such that any of said plurality of software modules is permitted to initiate or respond to communications from any other software module; and executing said plurality of software modules on said computing system using said computer-language-specific interface implementation for communicating data between said software modules.

2. The method of claim 1 wherein the definition of said computer-language-independent interface specification governing the interaction of said plurality of software modules across one or more processors further comprises:

providing the name of a parent specification whenever said interface specification is based upon said parent specification.

3. The method of claim 1 wherein said step of converting said computer-language-independent interface specification into said computer-language-specific interface implementation performed using a stub-code generation tool, regardless of whether said software modules are linked statically or dynamically.

4. The method of claim 1 wherein said step of defining a computer-language-independent interface specification further comprises the steps of:

grouping the operations of said interface specification into a plurality of two-party communications protocols, each of said two-party communications protocols specifying the communication between a pair of software modules that are parties to a communications contract; and specifying the constraints, if any, on the interaction of each of the pairs of software modules that are the parties to said communications contract.

5. The method of claim 4 wherein the specification of each of said two-party communications protocols further includes:

a name of said two-party communications protocol;

a name of a first software module;

an operational command set for said first software module;

a name of a second software module;

an operational command set for said second software module; and the constraints, if any, on the interaction of the two software modules that are the parties to said communications contract.

6. The method of claim 1 wherein the functional software modules created from said interface specification further comprises an interface agent.

7. The method of claim 6 wherein said interface agent additionally comprises a despatcher that receives a signal from a communication party, parses said signal into an address and a message, strips said address from said signal and distributes said message of said signal based upon said address to a recipient software module.

8. The method of claim 1 wherein the functional software modules created from said interface specification additionally includes a protocol supervisor operating as a state machine that supervises obedience to protocol rules predefined in said interface specification.

9. The method of claim 1 wherein information about all interfaces that have been implemented for software modules within said computing system is stored centrally in a trader module that is part of the kernel of the operating system of said computing system.

10. A system for generating and monitoring the interaction of a plurality of a dynamically varying set of software modules in a computing system having one or more processors, wherein each of said software modules is capable of interactively creating and manipulating objects belonging to one or more object classes, each of said object class being automatically generated from an interface specification, said system comprising:

means for defining a computer-language-independent interface specification to govern the interaction of said plurality of software modules across one or more processors by the steps providing a unique name for said interface specification;

providing a list of one or more instance variables which define the characteristics of a class of objects;

providing zero or more interaction variables specifying the public or private interaction of a group of said objects; and specifying constraints, if any, on the interaction of said software modules;

means for converting said computer-language-independent interface specification into a computer-language-specific interface implementation for a specific computing system using at least the following information;

a name of a communications protocol to be used for the interchange of data between said software modules:

an identification of the software modules that need to exchange data to interactively create and manipulate objects;

an operational command set for each such software module; and the constraints, if any, on the interaction of said software modules;

means for creating a plurality of functional software modules that are capable of interacting or communicating with each other using said computer-language-specific interface implementation;

means for regulating the interaction of said software modules such that any of said plurality of software modules is permitted to initiate or respond to communications from any other software module; and means for executing said plurality of software modules on said computing system using said computer-language-specific interface implementation for communicating data between said software modules.

11. The system of claim 10 wherein said means for defining computer-language-independent interface specification to govern the interaction of said plurality of software modules across one or more processors further comprises:

means for providing the name of a parent specification whenever said interface specification is based upon said parent specification.

12. The system of claim 10 wherein said means for converting said computer-language-independent interface specification into said computer-language-specific interface implementation comprises a stub-code generation tool, regardless of whether said software modules are linked statically or dynamically.

13. The system of claim 10 wherein said means for defining a computer-language-independent interface specification further comprises:

means for grouping the operations of said interface specification into a plurality of two-party communications protocols, each of said two-party communications protocols specifying the communication between a pair of software modules that are parties to a communications contract; and means for specifying the constraints, if any, on the interaction of each of the pairs of software modules that are the parties to said communications contract.

14. The system of claim 13 wherein the means for specifying each of said two-party communications protocols further comprises:

means for providing a name for said two-party communications protocol;

means for providing a name of a first software module;

means for providing an operational command set for said first software module;

means for providing a name of a second software module;

means for providing an operational command set for said second software module; and means for specifying the constraints, if any, on the interaction of the two software modules that are the parties to said communications contract.

15. The system of claim 10 wherein said means for creating functional software modules from said interface specification further comprises an interface agent.

16. The system of claim 15 wherein said interface agent additionally comprises a despatcher that receives a signal from a communication party, parses said signal into an address and a message, strips said address from said signal and distributes said message of said signal based upon said address to a recipient software module.

17. The system of claim 10 wherein said means for creating functional software modules from said interface specification additionally includes a protocol supervisor operating as a state machine that supervises obedience to protocol rules predefined in said interface specification.

18. The system of claim 10 further comprising central storage means within a trader module that is part of the kernel of the operating system of said computing system for storing information about all interfaces that have been implemented for software modules within said computing system.

19. The system of claim 10 wherein said computing system is a distributed or modular computing system of the type commonly used in telecommunications environments.

20. A method for generating and monitoring the interaction of a plurality of a dynamically varying set of software modules in a computing system having one or more processors, wherein each of said software modules is capable of interactively creating and manipulating objects belonging to one or more object classes, each of said object class being automatically generated from an interface specification, said method comprising the steps of:

defining a computer-language-independent interface specification to govern the interaction of said plurality of software modules across one or more processors by the steps of:

providing a unique name for said interface specification;

providing a list of one or more instance variables which define the characteristics of a class of objects;

providing zero or more interaction variables specifying the public or private interaction of a group of said objects; and specifying constraints, if any, on the interaction of said software modules;

converting said computer-language-independent interface specification into a computer-language-specific interface implementation for a specific computing system using at least the following information:

a name of a communications protocol to be used for the interchange of data between said software modules;

an identification of the software modules that need to exchange data to interactively create and manipulate objects;

an operational command set for each such software module; and the constraints, if any, on the interaction of said software modules;

creating a plurality of functional software modules that are capable of interacting or communicating with each other using said computer-language-specific interface implementation;

regulating the interaction of said software modules such that only one of each pair of software modules is permitted to initiate communication with the other, and the other software module of said pair is only permitted to respond to queries of said initiating software module; and executing said plurality of software modules on said computing system using said computer-language-specific interface implementation for communicating data between said software modules.

21. The method of claim 20 wherein the definition of said computer-language-independent interface specification governing the interaction of said plurality of software modules across one or more processors further comprises:

providing the name of a parent specification whenever said interface specification is based upon said parent specification.

22. The method of claim 20 wherein said step of converting said computer-language-independent interface specification into said computer-language-specific interface implementation is performed using a stub-code generation tool, regardless of whether said software modules are linked statically or dynamically.

23. The method of claim 20 wherein the functional software modules created from said interface specification further comprises an interface agent.

24. The method of claim 23 wherein said interface agent additionally comprises a despatcher that receives a signal from a communication party, parses said signal into an address and a message, strips said address from said signal and distributes said message of said signal based upon said address to a recipient software module.

25. The method of claim 20 wherein the functional software modules created from said interface specification additionally includes a protocol supervisor operating as a state machine that supervises obedience to protocol rules predefined in said interface specification.

26. The method of claim 20 wherein information about all interfaces that have been implemented for software modules within said computing system is stored centrally in a trader module that is part of the kernel of the operating system of said computing system.

27. A system for generating and monitoring the interaction of a plurality or a dynamically varying set of software modules in a computing system having one or more processors, wherein each of said software modules is capable of interactively creating and manipulating objects belonging to one or more object classes, each of said object class being automatically generated from an interface specification, said system comprising:

means for defining a computer-language-independent interface specification to govern the interaction of said plurality of software modules across one or more processors by the steps of:
providing a unique name for said interface specification:
providing a list of one or more instance variables which define the characteristics of a class of objects;
providing zero or more interaction variables specifying the public or private interaction of a group of said objects; and
specifying constraints, if any, on the interaction of said software modules;

means for converting said computer-language-independent interface specification into a computer-language-specific interface implementation for a specific computing system using at least the following information:
a name of a communications protocol to be used for the interchange of data between said software modules;
an identification of the software modules that need to exchange data to interactively create and manipulate objects;
an operational command set for each such software module; and
the constraints, if any, on the interaction of said software modules;

means for creating a plurality of functional software modules that are capable of interacting or communicating with each other using said computer-language-specific interface implementation;

means for regulating the interaction of said software modules such that only one of each pair of software modules is permitted to initiate communication with the other, and the other software module of said pair is only permitted to respond to queries of said initiating software module; and means for executing said plurality of software modules on said computing system using said computer-language-specific interface implementation for communicating data between said software modules.

28. The system of claim 27 wherein said means for defining said computer-language-independent interface specification to govern the interaction of said plurality of software modules across one or more processors further comprises:

means for providing the name of a parent specification whenever said interface specification is based upon said parent specification.

29. The system of claim 27 wherein said means for converting said computer-language-independent interface specification into said computer-language-specific interface implementation comprises a stub-code generation tool, regardless of whether said software modules are linked statically or dynamically.

30. The system of claim 27 wherein said means for creating functional software modules from said interface specification further comprises an interface agent.

31. The system of claim 30 wherein said interface agent additionally comprises a despatcher that receives a signal from a communication party, parses said signal into an address and a message, strips said address from said signal and distributes said message of said signal based upon said address to a recipient software module.

32. The system of claim 27 wherein said means for creating functional software modules from said interface specification additionally includes a protocol supervisor operating as a state machine that supervises obedience to protocol rules predefined in said interface specification.

33. The system of claim 27 further comprising central storage means within a trader module that is part of the kernel of the operating system of said computing system for storing information about all interfaces that have been implemented for software modules within said computing system.

34. The system of claim 27 wherein said computing system is a distributed or modular computing system of the type commonly used in telecommunications environments.

* * * * *

UNITED STATES PATENT AND TRADEMARK OFFICE
CERTIFICATE OF CORRECTION

| | | |
|---|---|---|
| PATENT NO. : | 5,546,584 | Page 1 of 2 |
| DATED : | Aug. 13, 1996 | |
| INVENTOR(S) : | Lundin, Kenneth et al. | |

It is certified that error appears in the above-indentified patent and that said Letters Patent is hereby corrected as shown below:

Cover Page — Insert "[73] Assignee: Telefonaktiebolaget L M Ericsson (publ.), Stockholm, Sweden"

Column 1, line 12 — Replace "Of" With --of--

Column 5, line 51 — Replace ".may" With --may--

Column 7, line 12 — Replace "preset" With --present--

Column 10, line 56 — Replace "us e" With --use--

Column 13, line 9 — Replace "stack" With --Stack--

Column 14, line 12 — After "used" Insert --at--

Column 17, line 29 — After "steps" Insert --of:--

UNITED STATES PATENT AND TRADEMARK OFFICE
CERTIFICATE OF CORRECTION

PATENT NO. : 5,546,584
DATED : Aug. 13, 1996
INVENTOR(S) : Lundin, Kenneth et al.

It is certified that error appears in the above-indentified patent and that said Letters Patent is hereby corrected as shown below:

Column 17, line 33   Replace "of;"
                         With --of:--

Column 17, line 35   Delete "in"

Column 19, line 4    After "steps"
                         Insert --of:--

Column 19, line 16   Replace "information;"
                         With --information:--

Column 21, line 4    Replace "arc"
                         With --are--

Column 21, line 50   Replace "or"
                         With --of--

Column 21, line 62   Replace "specification:"
                         With --specification;--

Signed and Sealed this

Eighteenth Day of March, 1997

Attest:

BRUCE LEHMAN

Attesting Officer         Commissioner of Patents and Trademarks